(12) United States Patent
Bagnall (10) Patent No.: US 10,190,501 B2
(45) Date of Patent: Jan. 29, 2019

(54) GAS TURBINES ENGINE SUPPORT STRUCTURES

(71) Applicant: ROLLS-ROYCE plc, London (GB)

(72) Inventor: Adam M Bagnall, Derby (GB)

(73) Assignee: ROLLS-ROYCE plc, London (GB)

( * ) Notice: Subject to any disclaimer, the term of this patent is extended or adjusted under 35 U.S.C. 154(b) by 747 days.

(21) Appl. No.: 14/868,719

(22) Filed: Sep. 29, 2015

(65) Prior Publication Data

US 2016/0108817 A1   Apr. 21, 2016

(30) Foreign Application Priority Data

Oct. 17, 2014   (GB) .................................. 1418396.6

(51) Int. Cl.
*F02C 7/20* (2006.01)
*F01D 25/28* (2006.01)
(Continued)

(52) U.S. Cl.
CPC .................. *F02C 7/20* (2013.01); *F01D 5/02* (2013.01); *F01D 25/162* (2013.01); *F01D 25/24* (2013.01); *F01D 25/28* (2013.01); *F02C 3/04* (2013.01); *F02K 3/06* (2013.01); *B64D 2027/266* (2013.01); *F05D 2220/32* (2013.01); *F05D 2220/36* (2013.01); *F05D 2240/24* (2013.01);
(Continued)

(58) Field of Classification Search
CPC ..... F02C 7/20; F02K 3/04; F02K 3/06; F01D 25/24; F01D 25/243; F01D 25/246; F01D 25/26; F01D 25/265; F01D 25/28; F05D 2260/15; F05D 2220/36; B64D 2027/266
See application file for complete search history.

(56) References Cited

U.S. PATENT DOCUMENTS 3,369,366 A * 2/1968 Howald .................... F02C 7/20
60/39.83
3,617,147 A * 11/1971 Bragg ..................... F01D 9/041
244/53 B
(Continued)

FOREIGN PATENT DOCUMENTS

CA   2 756 914 A1   5/2013
CA   2756914 A1 *   5/2013   ............... F02K 3/06
(Continued)

OTHER PUBLICATIONS

Feb. 17, 2016 Search Report issued in European Patent Application No. 15 18 7276.
(Continued)

*Primary Examiner* — Gerald L Suing
*Assistant Examiner* — Marc Amar
(74) *Attorney, Agent, or Firm* — Oliff PLC (57) ABSTRACT

A ducted fan gas turbine engine has a propulsive fan, a fan case surrounding the fan, a core engine, and a plurality of support structures which transmit loads from the core engine to the fan case. Each support structure has two support struts which extend from the core engine to a joint radially outwardly of the fan case. The support struts are spaced apart at the core engine but converge to meet at the joint. Each support structure further has two structural elements which extend from the joint to respective fixing positions on the fan case at opposite sides of the joint.

16 Claims, 9 Drawing Sheets

(51) Int. Cl.
*F02K 3/06* (2006.01)
*F01D 5/02* (2006.01)
*F01D 25/24* (2006.01)
*F02C 3/04* (2006.01)
*F01D 25/16* (2006.01)
*B64D 27/26* (2006.01)

(52) U.S. Cl.
CPC ...... *F05D 2240/35* (2013.01); *F05D 2260/15* (2013.01)

(56) References Cited

U.S. PATENT DOCUMENTS

| | | | | |
|---|---|---|---|---|
| 4,197,702 A * | 4/1980 | Robertson | ............ | F01D 25/162 415/142 |
| 4,266,741 A * | 5/1981 | Murphy | ................. | B64D 27/18 244/54 |
| 5,076,049 A * | 12/1991 | Von Benken | ........... | F01D 25/24 415/138 |
| 5,409,184 A * | 4/1995 | Udall | ..................... | B64D 27/12 244/54 |
| 5,860,275 A * | 1/1999 | Newton | ................. | B64D 27/18 244/54 |
| 6,976,655 B2 | 12/2005 | Thompson | | |
| 9,784,129 B2 * | 10/2017 | Eleftheriou | ............ | F01D 25/162 |
| 9,828,877 B2 * | 11/2017 | Riviere | ................. | F01D 25/162 |
| 2004/0108413 A1* | 6/2004 | Thompson | ............. | B64D 27/26 244/54 |
| 2006/0038066 A1* | 2/2006 | Udall | ..................... | B64D 27/20 244/54 |
| 2007/0261411 A1* | 11/2007 | Nagendra | ............. | F01D 25/162 60/796 |
| 2008/0011932 A1* | 1/2008 | Stretton | .................... | B66C 1/10 248/544 |
| 2010/0047066 A1* | 2/2010 | Derenes Jacky | ....... | F01D 25/24 415/201 |
| 2010/0206981 A1* | 8/2010 | Baillard | ................. | B64D 27/26 244/54 |
| 2010/0287950 A1* | 11/2010 | Heyerman | ................. | F02C 7/20 60/797 |
| 2010/0290903 A1* | 11/2010 | Heyerman | ............. | B64D 27/26 415/213.1 |
| 2012/0051903 A1* | 3/2012 | Heyerman | ............. | B64D 27/20 415/213.1 |
| 2012/0222396 A1* | 9/2012 | Clemen | ................. | F01D 25/162 60/226.1 |
| 2012/0243984 A1* | 9/2012 | Rishton | ................. | F01D 25/162 415/213.1 |
| 2013/0014515 A1* | 1/2013 | Bellabal | ................. | F01D 21/045 60/797 |
| 2013/0084174 A1* | 4/2013 | Maalouf | ................. | F01D 25/246 415/208.1 |
| 2013/0167553 A1* | 7/2013 | Bellabal | .................... | F02C 7/20 60/796 |
| 2014/0112770 A1* | 4/2014 | Riviere | ................. | F01D 25/162 415/213.1 |
| 2014/0311161 A1* | 10/2014 | Bellabal | ................. | F01D 5/145 60/796 |
| 2015/0007580 A1* | 1/2015 | Bellabal | .................... | F02C 7/20 60/797 |
| 2016/0032837 A1* | 2/2016 | Eleftheriou | ........... | F01D 25/162 60/772 |
| 2016/0200443 A1* | 7/2016 | Bellabal | ................. | B64D 27/26 415/213.1 |

FOREIGN PATENT DOCUMENTS

| | | |
|---|---|---|
| EP | 0 147 878 A1 | 7/1985 |
| EP | 2 578 813 A1 | 4/2013 |
| GB | 2468485 A | 9/2010 |
| WO | 2014/051662 A1 | 4/2014 |

OTHER PUBLICATIONS

Apr. 16, 2015 Search Report issued in British Application No. 1418396.6.

* cited by examiner

GAS TURBINES ENGINE SUPPORT STRUCTURES

TECHNICAL FIELD

The present disclosure relates to a ducted fan gas turbine engine having a plurality of support structures which transmit loads from a core of the engine to a fan case.

BACKGROUND

In ducted fan gas turbine engines, air entering the intake of the engine is accelerated by a fan to produce two air flows: a first air flow which enters a core engine, and a second air flow which passes through a bypass duct to provide propulsive thrust. A fan case surrounds the fan and extends rearwardly therefrom to define an outer wall of the bypass duct. An inner wall of the bypass duct is defined by the outer skin of the core engine.

Between the inner and outer walls of the bypass duct, rearwards of the fan, it is known conventionally to provide A-frame support structures which reinforce the fan case and transmit loads from the core engine to the fan case.

Figure 1:
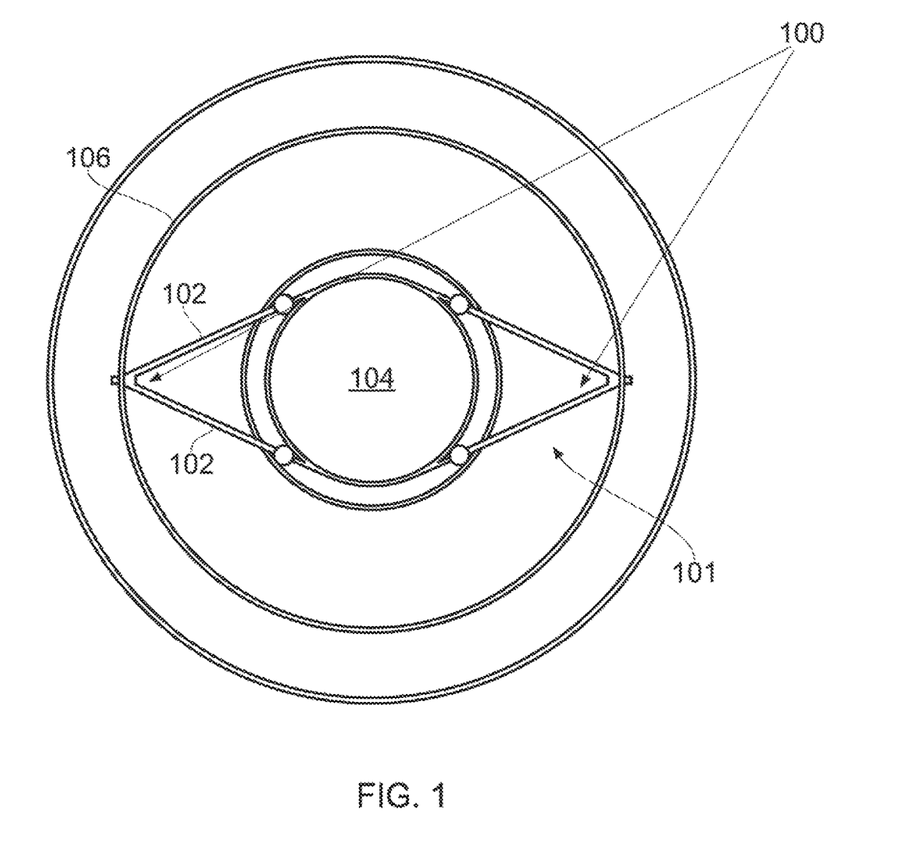
FIG. 1 shows schematically a transverse cross-section through an engine.

FIG. 1 shows schematically a transverse cross-section through an engine which has two diametrically opposing A-frame support structures 101. Each support structure comprises two support struts 102 which extend from spaced apart locations on the core engine 104 to meet at the fan case 106.

Figure 2:
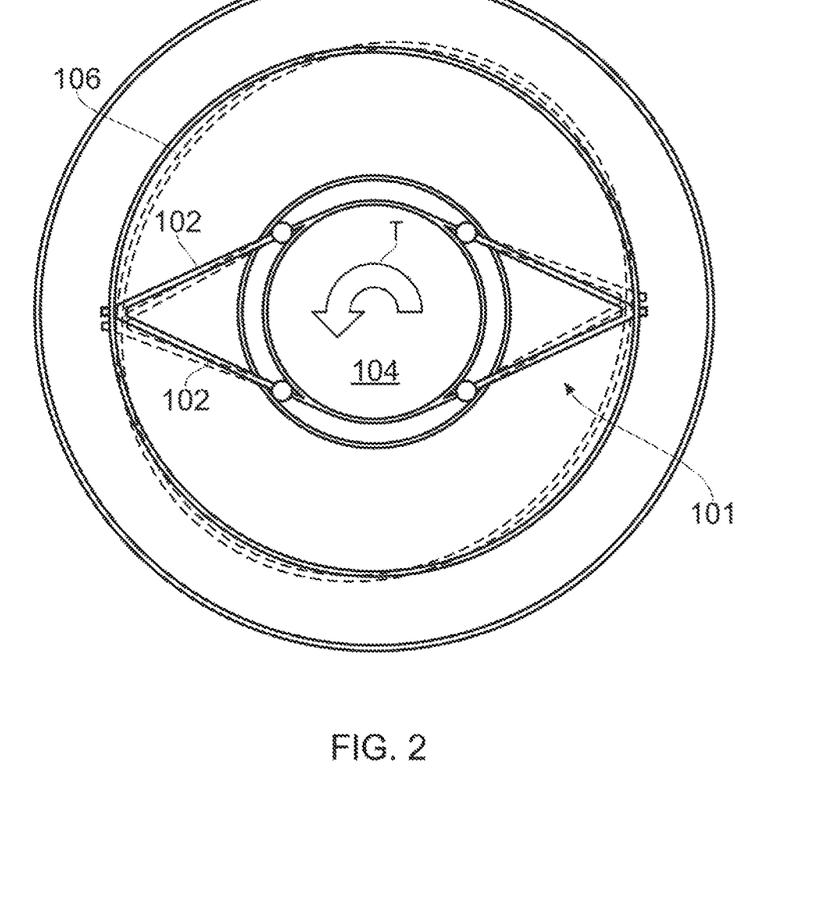
FIG. 2 shows the cross-section of FIG. 1 under a torque load.

However, as shown in FIG. 2, under a torque load T the support structures 101 can distort the shape of the fan case 106 (as indicated by the dashed lines), resulting in excessive fan tip clearances and associated aerodynamic losses. In addition, the junction of the support struts 102 within the bypass duct, presents an undesirable aerodynamic blockage to the airflow within the bypass duct producing further aerodynamic losses.

One approach to reduce the distortion is to stiffen the fan case with, for example, a stiffening flange. However, this increases weight, and does not address the undesirable blockage to the airflow within the bypass duct.

Figure 3:
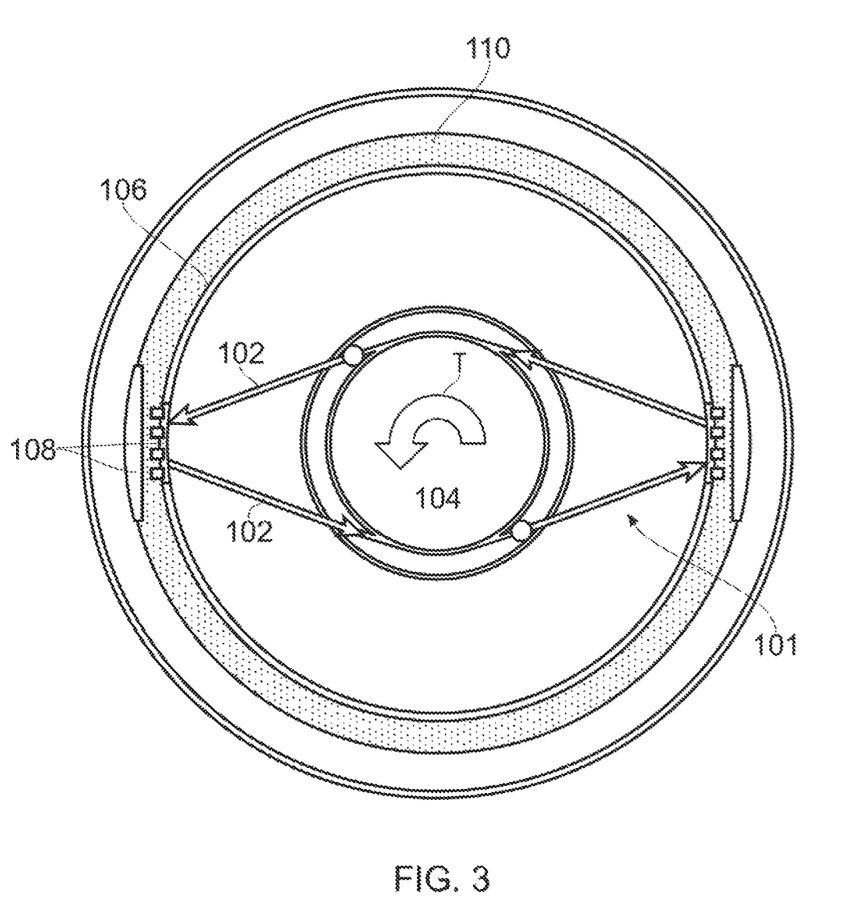
FIG. 3 shows schematically a transverse cross-section through a variant engine.

An alternative approach is to space the support struts 102 apart at the fan case 106, as shown in FIG. 3, with local reinforcements 108 spreading loads into a stiffener flange 110. This approach reduces the aerodynamic losses due to the distortion and aerodynamic losses associated with the support struts due to no longer having the junction of the struts within the bypass duct. However, the struts transmit loads inefficiently into the structure, so requiring the local reinforcements and the stiffener flange which can increase the weight of the structure.

SUMMARY OF THE DISCLOSURE

In a first aspect there is provided a ducted fan gas turbine engine having a propulsive fan, a fan case surrounding the fan, a core engine, and a plurality of support structures which transmit loads from the core engine to the fan case, each support structure having: two support struts which extend from the core engine to a joint radially outwardly of the fan case, the support struts being spaced apart at the core engine but converging to meet at the joint; and two structural elements which extend from the joint to respective fixing positions on the fan case at opposite sides of the joint.

By joining the support struts outside the fan case and providing the structural elements, it is possible to feed loads into the fan case more efficiently and thereby reduce distortion of the fan case under torque loads. This reduces the aerodynamic losses due to the distortion and avoids aerodynamic losses associated with having a support strut junction within the bypass duct, whilst also avoiding much of the weight penalty associated with spaced struts and a stiffened fan case.

Optional features of the first aspect are now set out below. These are applicable singly or in any combination.

The distance from the joint to an inner wall of the fan case may be at least 5% and/or at most 45% of the radius of the inner wall of the fan case.

The structural elements may be substantially tangential to the fan case at their fixing positions. This allows loads to be transmitted efficiently to the fan case through the structural elements.

The fixing positions of the structural elements of each support structure may be at least 30° and/or at most 120° apart on the fan case.

The support struts of each support structure may extend from positions on the core engine which are at least 45° and/or at most 180° apart on the core engine.

The support struts and the structural elements of each support structure may extend in substantially the same plane, typically a plane that is perpendicular to the axis of the engine.

The structural elements can be formed as ribs integrated with the fan case.

The structural elements can be individual links that are attached to the fan case with suitable fasteners.

The structural elements can be part of an additional structure which is attached to the fan case with suitable fasteners.

The engine may have two support structures at opposite sides of the engine, for example at opposite left and right sides of the engine.

The support struts may pass through respective apertures in the fan case, a boot being provided around the support struts externally of the fan case to seal the apertures.

The support struts may have elliptical, or tear-drop shaped or some other aerodynamically shaped cross-sections. The long axes of the cross-sections can then be aligned with the direction of an airflow accelerated by the fan, and in particular aligned with the direction of an airflow accelerated through a bypass duct having an outer wall defined by the fan case and inner wall defined by the core engine.

The support struts may be perpendicular to a longitudinal axis of the gas turbine engine. Alternatively, the support struts may be angled in an axial direction so as to extend both radially and axially. For example, the support struts may be angled such that a radially outer portion of the support struts is axially forward (or upstream) of a radially inner portion of the support struts.

An angle between the support struts and a longitudinal axis of the gas turbine engine may be equal to or between 20° and 80°, e.g. greater than or equal to 30°, greater than or equal to 40°, and/or less than or equal to 70°, e.g. 60°.

The ducted fan gas turbine engine may comprise a further structural element which extends from the joint to a fixing position on the fan case at a position axially forward of the support struts.

The gas turbine engine may comprise at least one bifurcation. The gas turbine engine may comprise two bifurcations diametrically opposed.

The support struts may be substantially circumferentially aligned with the bifurcation. When there are two support structures, and two bifurcations, support struts of one support structure may be circumferentially aligned with one bifurcation and support struts of the other support structure may be circumferentially aligned with the other bifurcation.

The support struts may are housed within at least one bifurcation.

The support struts may be circumferentially offset (e.g. by 90°) from the bifurcation. When two support structures are provided, the support structures may be diametrically opposed, such that both support structures are offset from the at least one bifurcation.

BRIEF DESCRIPTION OF THE DRAWINGS

Embodiments will now be described by way of example with reference to the accompanying drawings in which.

DETAILED DESCRIPTION

Figure 4:
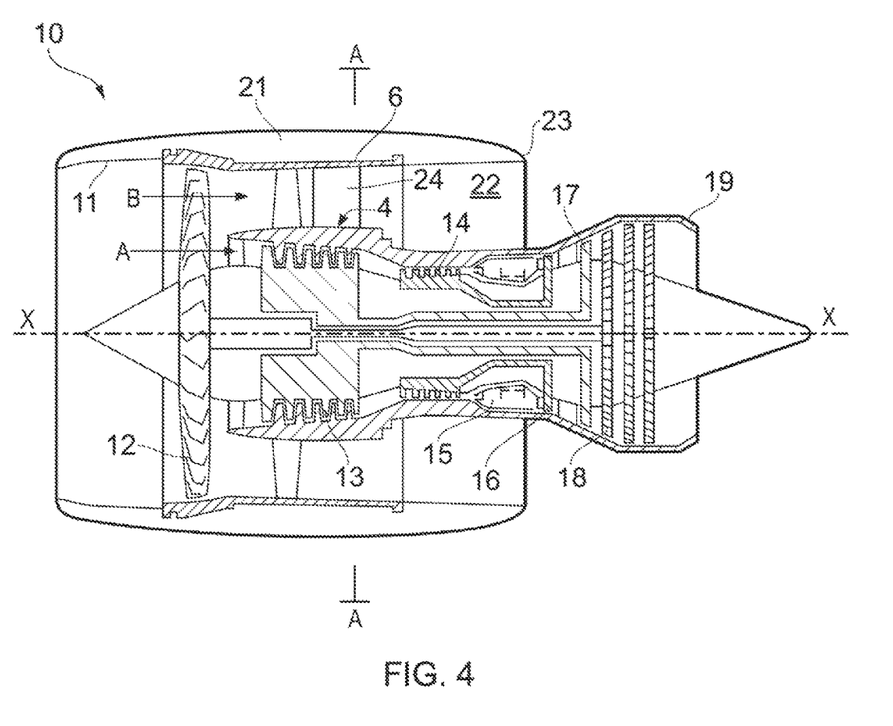
FIG. 4 shows a longitudinal cross-section through a ducted fan gas turbine engine.

With reference to FIG. 4, a ducted fan gas turbine engine is generally indicated at 10 and has a principal and rotational axis X-X. The engine comprises, in axial flow series, an air intake 11, a propulsive fan 12, and a core engine 4, which itself comprises, in axial flow series, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A fan case 6 surrounds the fan 12 and defines an outer wall of a bypass duct 22. An inner wall of the bypass duct 22 is defined by an outer skin of the core engine 4. A nacelle 21 generally surrounds the engine 10 and defines the intake 11 and a bypass exhaust nozzle 23.

During operation, air entering the intake 11 is accelerated by the fan 12 to produce two air flows: a first air flow A into the core engine 4 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 5:
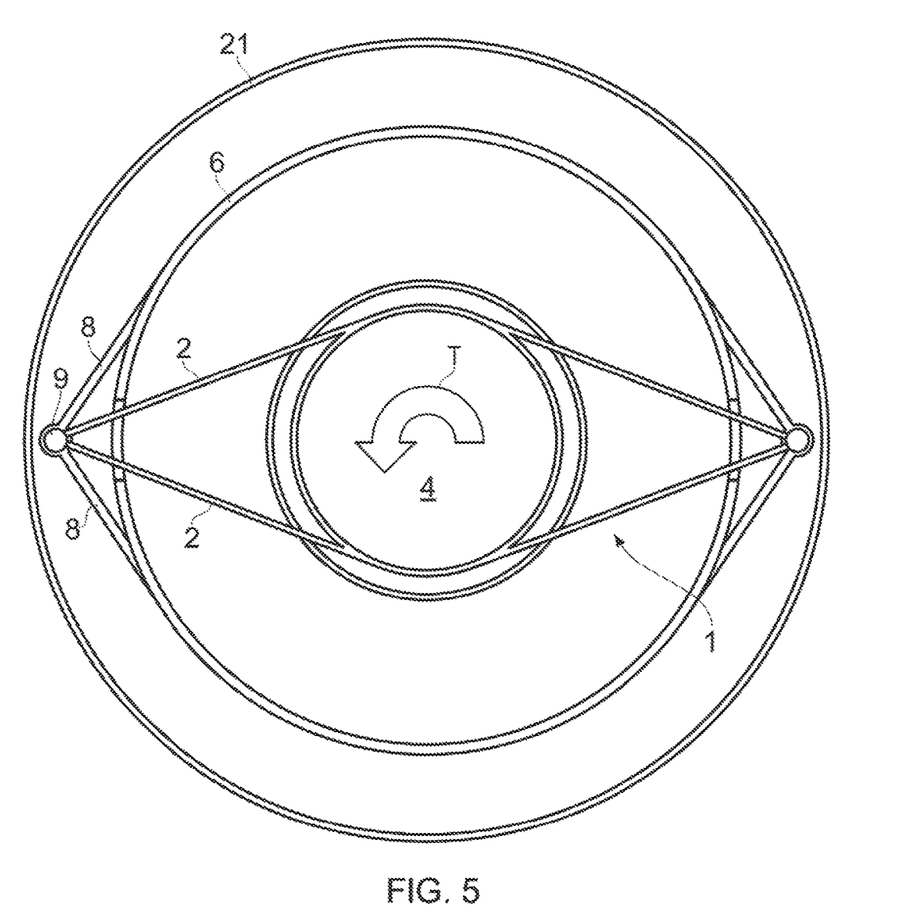
FIG. 5 shows schematically a transverse cross-section through the engine of FIG. 4 at plane A-A highlighting a support structure of the engine.

FIG. 5 shows schematically a transverse cross-section through the engine 10 on plane A-A rearwards of the fan 12. The engine has two support structures 1 at opposite left and right hand sides of the engine.

Each support structure 1 has two support struts 2 which extend from the core engine 4 to meet at a joint 9 radially outwardly of the fan case 6, the struts passing through respective apertures in the fan case. The joint, which is still within the nacelle 21, can be spaced from the inner wall of the fan case by a distance which is about 20% of the radius of the inner wall of the fan case. The support struts can be spaced about 90° apart on the core engine. A boot (not shown) may be placed over the joint and the parts of the support struts external to the fan case in order to seal the apertures and prevent the second air flow B leaking from the bypass duct 22. Further, at least over those parts of the support struts which span the bypass duct, the struts may have elliptical, or tear-drop shaped or some other aerodynamically preferred cross-sections, the long axes of the cross-sections being aligned with the second air flow to reduce aerodynamic losses caused by the passage of the air flow around the struts.

Each support structure 1 also has two structural members 8 which extend from the joint 9 to respective fixing positions on the fan case 6 at opposite sides of the joint. The fixing positions can be about spaced between 30° to 120° apart on the fan case. The structural members, which are preferably substantially tangential to the fan case at their fixing positions, complete the core engine-fan case structure, but at much reduced weight penalty compared to approaches discussed above in relation to FIG. 3. In particular, the support struts 2 and the structural members 8 effect efficient transmission of loads (indicated in FIG. 5 by the arrows at the ends of the struts and structural members) to the four fixing positions which are distributed around the circumference of the fan case. In this way, under a torque load T, there is little distortion of the fan case and so significantly reduced aerodynamic loss.

Figure 6:
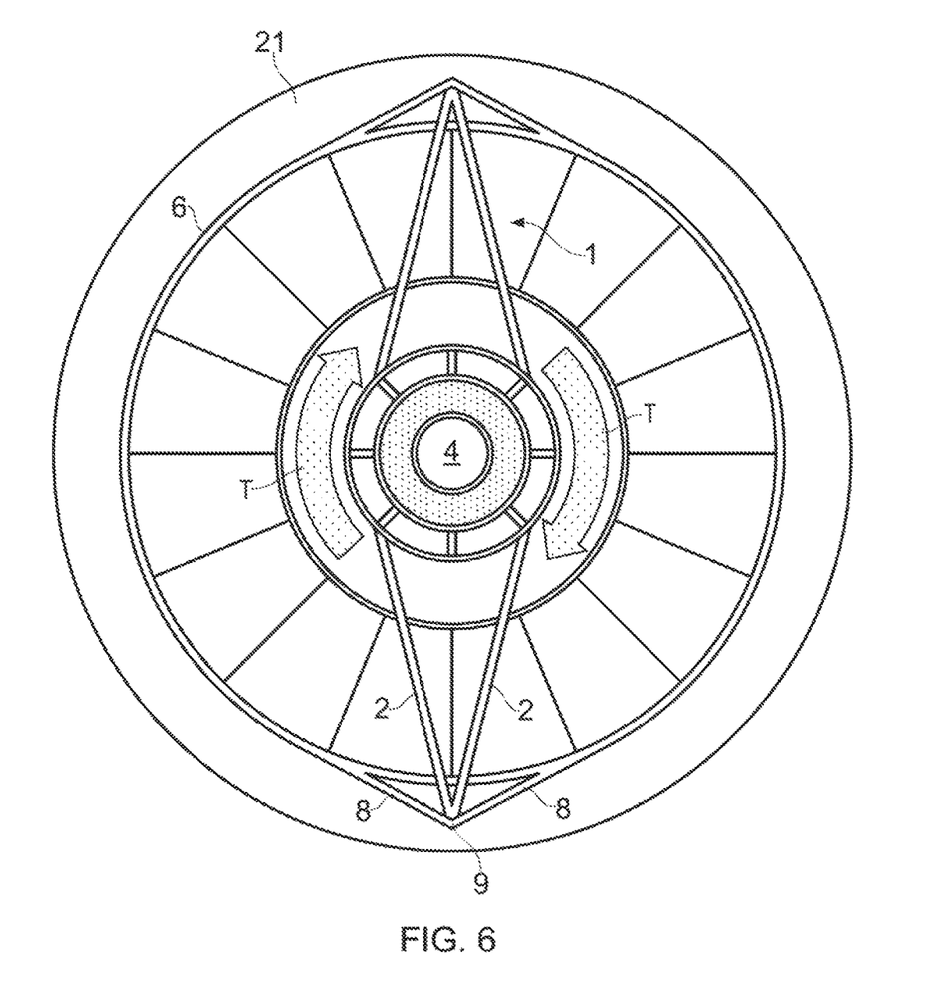
FIG. 6 shows schematically a transverse cross-section through the engine of FIG. 4 at plane A-A highlighting an alternative support structure of the engine.
Figure 7:
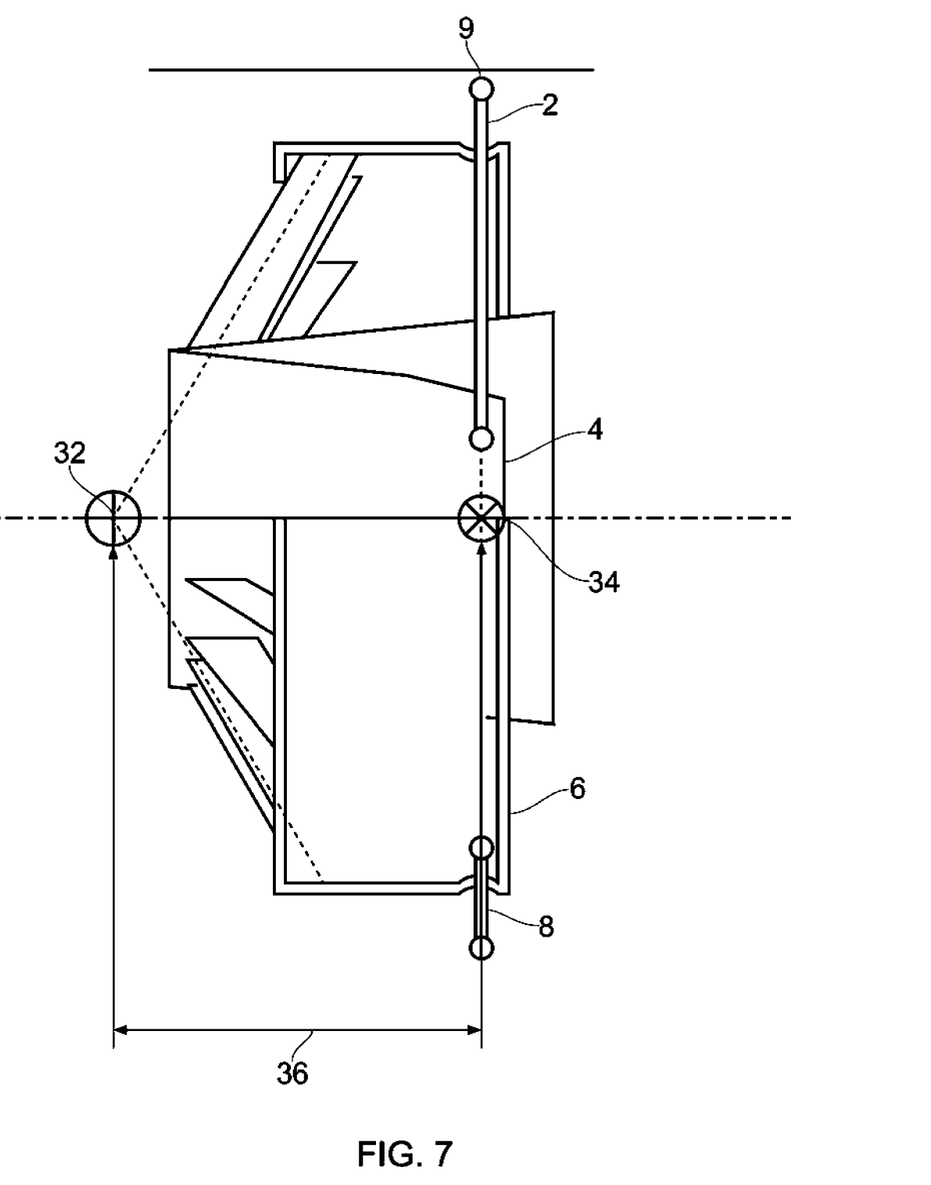
FIG. 7 shows a schematic side view of the engine of FIG. 6, with an upper portion of the fan casing removed.

Referring now to FIGS. 6 and 7, an alternative support structure for a gas turbine engine is shown. Similar reference numerals are given for features previously described. In the embodiment shown in FIGS. 6 and 7, two support structures 1 are provided. The support structures are diametrically opposed, but instead of being to the right and left side of the engine they extend in an upwards and downwards direction, when the gas turbine engine is mounted for use. For example, instead of being offset (e.g. by 90° from a bifurcation of the gas turbine engine—indicated at 24 in FIG. 4) one of the support structures is circumferentially aligned with the bifurcation. In all other respects the support structures are similar to those previously described.

Provision of support structures extending in an upwards and a downwards direction means that it may be possible to arrange one of the support structures to fit within the bifurcation.

Figure 8:
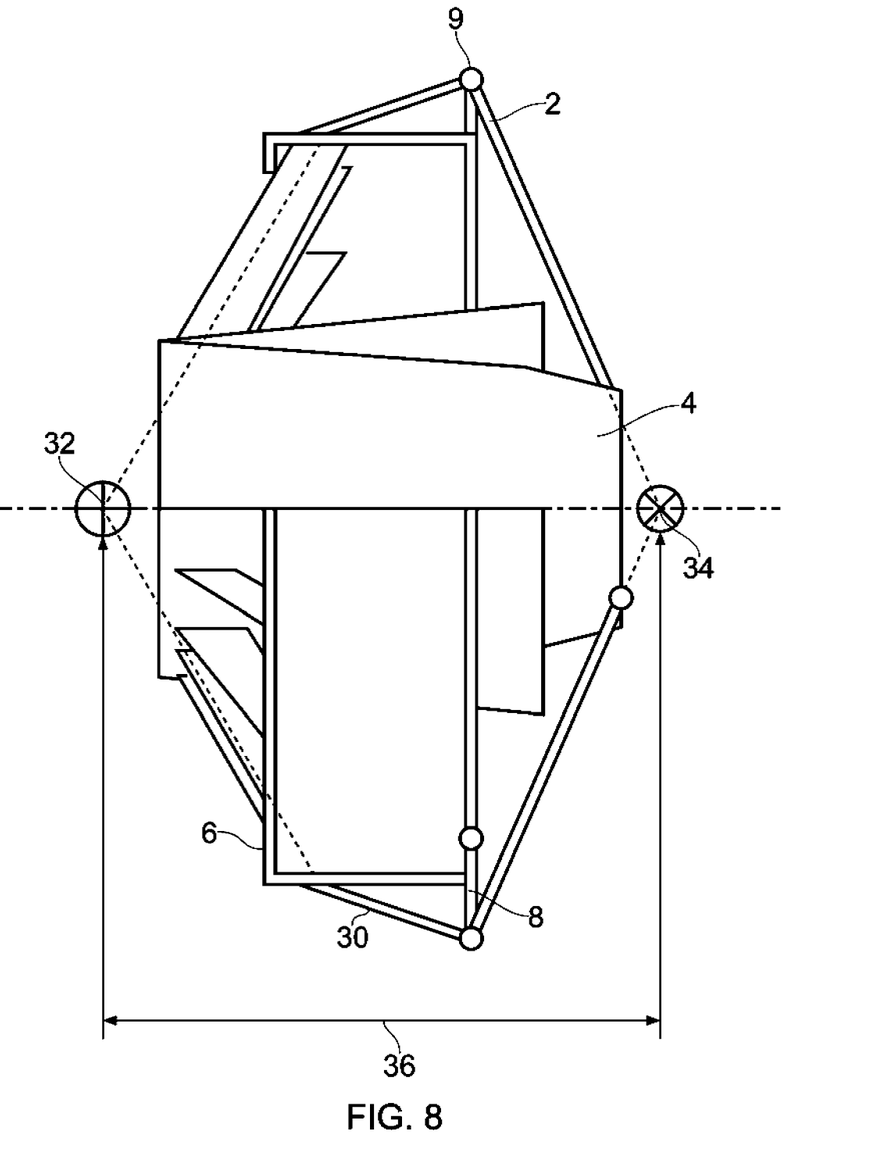
FIG. 8 shows a schematic side view of a further alternative support structure with an upper portion of the fan casing removed.
Figure 9:
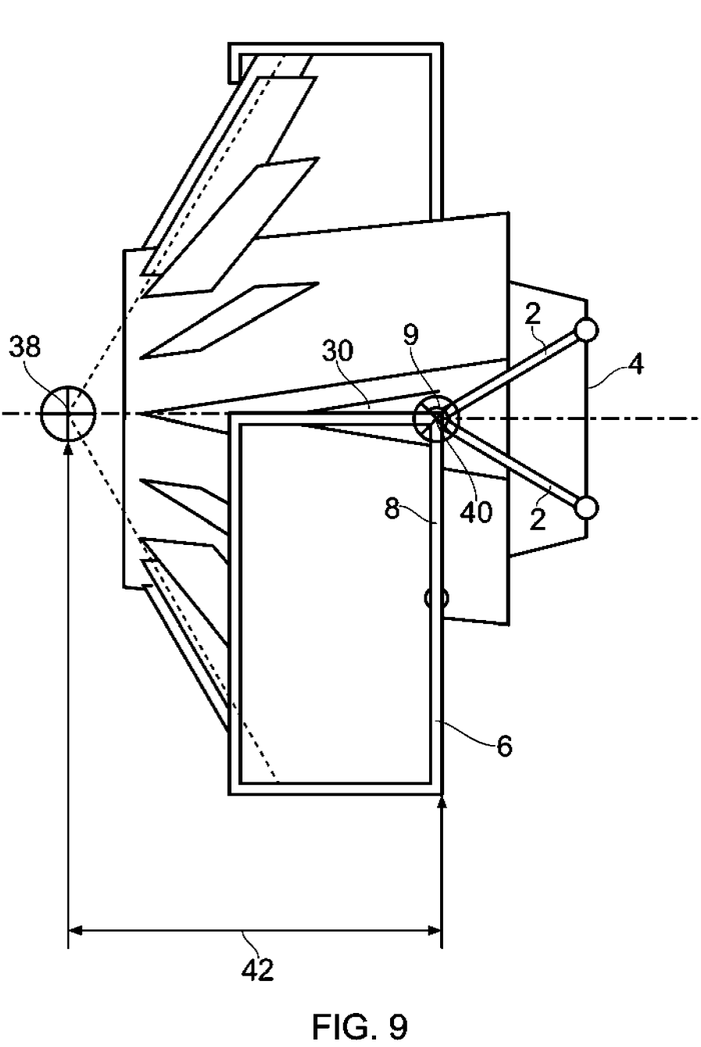
FIG. 9 shows schematically a plan view of the engine of FIG. 8 with a portion of the fan casing removed.

Referring now to FIGS. 8 and 9, a further alternative support structure for a gas turbine engine is shown. Similar reference numerals are given for features previously described.

The embodiment shown in FIGS. 8 and 9 is similar to the embodiment shown in FIGS. 6 and 7, but with the difference that the support struts 2 instead of extending only in a radial direction (e.g. being arranged at 90° to a longitudinal axis of the engine) the support struts are inclined so as to be angled to the longitudinal axis of the engine. The support struts are angled so that a radially outer portion of the support struts is at a more axially forward position than a radially inner portion of the support struts. A further support element 30, similar to support elements 8 is provided. The support element 30 extends from the joint 9 between the support struts to the core casing in an axial direction.

Angling of the support struts and the provision of an additional support element can help to increase the stiffness of the support structure so as to limit fan case deformation and distortion.

The support structures described can improve resistance to yaw, pitch and torque during operation of the gas turbine engine. For example, referring to FIGS. 7 and 8 it can be seen that the virtual centre 32 of the OGV structure in pitch is spaced by a large distance 36 from the virtual centre 34 of the support structure in pitch, this large separation resists pitch deflections. Referring to FIG. 9, the virtual centre 38 of the OGV structure in yaw is spaced by a large distance 42 from the virtual centre 40 of the support structure in yaw, this large separation resists yaw deflections.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A ducted fan gas turbine engine having a propulsive fan, a fan case surrounding the fan, a core engine, and a plurality of support structures which transmit loads from the core engine to the fan case, each support structure having:
   two support struts which extend from the core engine to a joint radially outwardly of the fan case, the support struts being spaced apart at the core engine but converging to meet at the joint forming a first A-frame structure with the joint at an apex of the first A-frame structure; and
   two structural elements which extend from the joint to respective fixing positions on the fan case at opposite sides of the joint forming a second A-frame structure with the joint at an apex of the second A-frame structure.

2. The ducted fan gas turbine engine according to claim 1, wherein a distance from the joint to an inner wall of the fan case is at least 5% of the radius of the inner wall of the fan case.

3. The ducted fan gas turbine engine according to claim 1, wherein the structural elements are substantially tangentially to the fan case at the respective fixing positions of the structural elements.

4. The ducted fan gas turbine engine according to claim 1, wherein the fixing positions of the structural elements of each support structure are at least 30° apart on the fan case.

5. The ducted fan gas turbine engine according to claim 1, wherein the support struts of each support structure extend from positions on the core engine which are at least 45° apart on the core engine.

6. The ducted fan gas turbine engine according to claim 1, wherein the support struts and the structural elements of each support structure extend in substantially the same plane.

7. The ducted fan gas turbine engine according to claim 1, wherein the support struts have elliptical or tear-drop shaped cross-sections.

8. The ducted fan gas turbine engine according to claim 1, wherein the support struts extend in a plane that is perpendicular to a longitudinal axis of the gas turbine engine.

9. The ducted fan gas turbine engine according to claim 1, wherein the support struts are angled in an axial direction so as to extend both radially and axially.

10. The ducted fan gas turbine engine according to claim 9, wherein the support struts are angled such that a radially outer portion of the support struts is axially forward of a radially inner portion of the support struts.

11. The ducted fan gas turbine engine according to claim 9, wherein an angle between the support struts and a longitudinal axis of the gas turbine engine is from 20 degrees and to 80 degrees.

12. The ducted fan gas turbine engine according to claim 9, wherein each support structure further comprises a further structural element which extends from the joint to a fixing position on the fan case of the further structural element at a position axially forward of the support struts.

13. The ducted fan gas turbine engine according to claim 1, wherein the gas turbine engine comprises a bifurcation and wherein the support struts of one of the plurality of support structures are substantially circumferentially aligned with the bifurcation.

14. The ducted fan gas turbine engine according to claim 13, wherein the support struts of the one of the plurality of support structures are housed within the bifurcation.

15. The ducted fan gas turbine engine according to claim 1, wherein the gas turbine engine comprises a bifurcation, and wherein the support struts of the plurality of support structures are circumferentially offset from the bifurcation.

16. The ducted fan gas turbine engine according to claim 1, having a first support structure of the plurality of support structures positioned at an opposite side of the engine from a second support structure of the plurality of support structures.

* * * * *